US008553528B2

(12) United States Patent
Ghibaudo et al.

(10) Patent No.: US 8,553,528 B2
(45) Date of Patent: Oct. 8, 2013

(54) APPARATUS AND METHOD FOR CONNECTING AN ELECTRONIC DEVICE TO A TELECOMMUNICATION NETWORK USING FIXED AND MOBILE ACCESS NETWORKS

(75) Inventors: Marco Giorgio Ghibaudo, Gressan Aosta (IT); Beatriz Garriga, Madrid (ES); Luis Zas, Madrid (ES); Jose Angel Perez, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 265 days.

(21) Appl. No.: 12/919,201

(22) PCT Filed: Oct. 17, 2008

(86) PCT No.: PCT/EP2008/064079
§ 371 (c)(1),
(2), (4) Date: Dec. 28, 2010

(87) PCT Pub. No.: WO2009/106158
PCT Pub. Date: Sep. 3, 2009

(65) Prior Publication Data
US 2011/0110299 A1    May 12, 2011

(30) Foreign Application Priority Data
Feb. 25, 2008    (IT) .......................... MI2008A000295

(51) Int. Cl.
*G01R 31/08*    (2006.01)
(52) U.S. Cl.
USPC ........................................................ 370/216
(58) Field of Classification Search
USPC ................... 370/351–430, 216–228
See application file for complete search history.

(56) References Cited

U.S. PATENT DOCUMENTS

| 6,198,920 B1 * | 3/2001 | Doviak et al. ............... 455/426.1 |
| 2004/0266424 A1 | 12/2004 | Park et al. |
| 2007/0237110 A1 * | 10/2007 | Bennett ......................... 370/328 |

FOREIGN PATENT DOCUMENTS

| EP | 1 517 575 | 3/2005 |
| WO | 98/43463 | 10/1998 |
| WO | 01/63946 | 8/2001 |
| WO | 02/41580 | 5/2002 |

OTHER PUBLICATIONS

International Search Report from International Application No. PCT/EP2008/064079.

* cited by examiner

*Primary Examiner* — Fan Ng
(74) *Attorney, Agent, or Firm* — Workman Nydegger (57) ABSTRACT

The present invention relates to an apparatus (100) for the connection of at least one electronic device (30) to a telecommunication network comprising a fixed telecommunication network (40) and a mobile telecommunication network (41). The apparatus (100) comprises connecting means (20) for connecting said at least one electronic device (30) and a first interface (21) able to exchange data/voice with a fixed telecommunication network (40). The apparatus (100) further comprises a second interface (22) able to exchange data/voice with a mobile telecommunication network (41), a connection manager (60) for establishing a communication between said connecting means (20) with said first interface (21) and/or said second interface (22), and control means (61) in signal communication with said connection manager (60) and able to generate a control signal to control said connection manager (61), so as to determine the exchange of data/voice between the electronic device (30) connected to the connecting means (20) and the fixed telecommunication network (40) and/or the mobile telecommunication network (41).

23 Claims, 4 Drawing Sheets

APPARATUS AND METHOD FOR CONNECTING AN ELECTRONIC DEVICE TO A TELECOMMUNICATION NETWORK USING FIXED AND MOBILE ACCESS NETWORKS

FIELD OF THE INVENTION

The present invention relates to an apparatus and method for connecting an electronic device to a telecommunication network.

In particular, the apparatus and method of the present invention allow connecting an electronic device to the internet network, through connection to a telecommunication network.

BACKGROUND OF THE INVENTION

Apparatus for connecting electronic devices to telecommunication networks are universally referred to as "modems" and they modulate the signal transmitted by the electronic device to the telecommunication network and demodulate the signal received by the telecommunication network and transmitted to the electronic device.

Within the present invention, the term "electronic device" comprises any device capable of being connected to a telecommunication network and exchanging data/voice therewith. A typical electronic device can for example be a computer, a palmtop, a mobile terminal and the like.

Currently, there are known and widely used apparatus which allow fixed telecommunication network connection of the xDSL type which provides a considerably broad bandwidth and offers the possibility to establish high speed data transfer connections.

Figure 1:
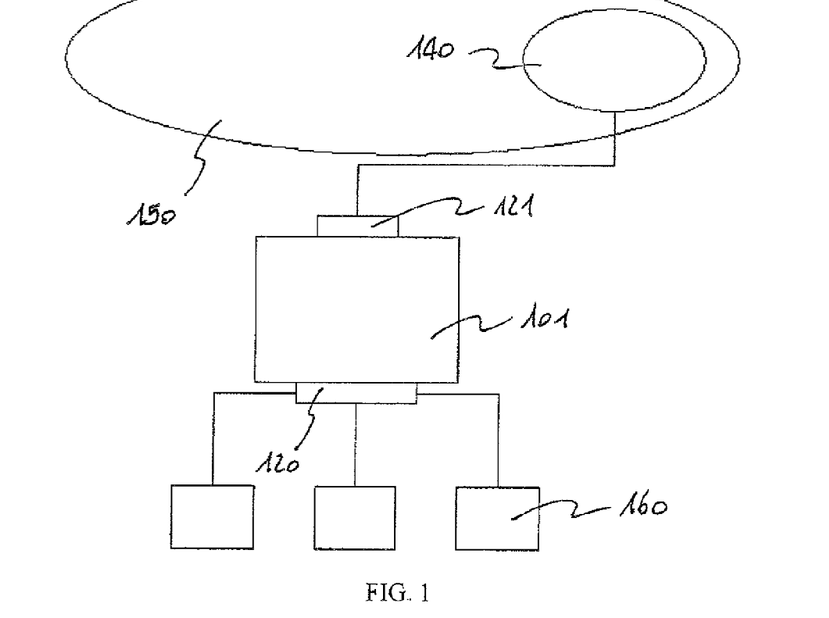
FIG. 1 shows an overall view of an apparatus of the prior art for connecting an electronic device to a telecommunication network.

Referring to FIG. 1, 101 indicates a typical apparatus for connection to a telecommunication network 150 comprising a fixed network 140. The apparatus 101 comprises connecting means 120 for connecting to one or more electronic devices 160 of a user, and an interface 121 for connecting to the fixed telecommunication network 140.

In order to connect the device 160 to the telecommunication network 150, the user is required to establish a connection to the fixed telecommunication network 140 by means of a connection apparatus 101.

However, apparatus of the abovementioned type have some drawbacks.

In case of malfunctions or failures in the fixed telecommunication network, the connection apparatus is not capable of maintaining the connection between the electronic device and the telecommunication network, for example to the internet network accessible through the fixed telecommunication network. In this case, the electronic device is disconnected from the internet network and the user can no longer exchanger data/voice with such network in that the connection is interrupted.

According to the points outlined above, there arises the need to have an apparatus capable of guaranteeing constant connection to the telecommunication network regardless of the operation status of the fixed telecommunication network with the aim of avoiding loss of data or the interruption of the voice communication during the connection of the abovementioned electronic devices to the telecommunication network.

SUMMARY OF THE INVENTION

Therefore, an object of the present invention is that of providing an apparatus having such functional characteristics to meet the abovementioned requirements and simultaneously overcome the aforementioned drawbacks referring to the prior art.

Such object is achieved by an apparatus for connecting an electronic device to a telecommunication network according to claim 1.

According to a further aspect, the invention regards a method for connecting an electronic device to a telecommunication network according to claim 18.

The invention is related to an apparatus for connecting at least one electronic device to a telecommunication network comprising a fixed telecommunication network and a mobile telecommunication network, said telecommunication network supporting a plurality of services, the apparatus comprising:

connecting means for connecting said at least one electronic device;

a first interface able to exchange data/voice with said fixed telecommunication network according to one or more of said plurality of services;

According to a first aspect of the invention, said apparatus comprises:

a second interface able to exchange data/voice with said mobile telecommunication network according to one or more of said plurality of services;

a connection manager for establishing a communication:
between said connecting means and said first interface, or
between said connecting means and said second interface, or
between said connecting means and both said first interface and said second interface; and, control means in signal communication with said connection manager and able to generate a control signal to control said connection manager, so as to determine an exchange of data/voice between the electronic device connected to said connecting means and:
the fixed telecommunication network, or
the mobile telecommunication network, or
the fixed telecommunication network for a first subset of said plurality of services and the mobile telecommunication network for a second subset of said plurality of services.

In the scope of the present invention, the information exchangeable between the electronic device and the telecommunication network comprise data, for example data packet, voice and voice over internet protocol (VoIP). Hereinafter, such information shall generally be referred to as "data/voice".

Said electronic device to be connected to the apparatus can be a computer, a mobile terminal, a palmtop, a TV apparatus or any other electronic device capable of exchanging information containing data/voice with the telecommunication network, which supports a plurality of services.

Due to the presence of the connection manager controllable by the control means, a constant exchange of data/voice between the electronic device and the telecommunication network is possible, in that a connection with the fixed telecommunication network, or mobile telecommunication network, or with the fixed telecommunication network for a first subset of the plurality of services and with the mobile telecommunication network for a second subset of services, is always guaranteed (said first subset of services preferably being disjoint with said second subset of services).

Therefore, the apparatus guarantees that the connection to the telecommunication network is always active regardless of the operation status of the fixed telecommunication network, thus avoiding loss of information and hence allow the user to continue exchanging data/voice when using the electronic device.

Preferred embodiments of the apparatus of the invention are defined in the dependent claims.

A second aspect of the invention refers to a method for connecting at least one electronic device to a telecommunication network comprising a fixed telecommunication network and a mobile telecommunication network, said telecommunication network supporting a plurality of services, which comprises the steps of:

a) connecting, through connecting means, said at least one electronic device to an apparatus as defined in any of claims 1-18, b) connecting, through the connection manager, said apparatus to the fixed telecommunication network, or to the mobile telecommunication network, or both to the fixed telecommunication network for a first subset of said plurality of services and to the mobile telecommunication network for a second subset of said plurality of services, and c) generating a control signal for controlling said communication manager to determine an exchange of data/voice between said the electronic device connected to said connecting means and said fixed telecommunication network, or said mobile telecommunication network, or both the fixed telecommunication network and the mobile telecommunication network.

Preferred embodiments of the method of the invention are defined in the dependent claims.

The advantages of the proposed invention will become apparent in the description that follows.

BRIEF DESCRIPTION OF THE DRAWINGS

Further characteristics and advantages of the present invention shall be clearer from the description, provided hereinafter, of its preferred embodiment given for indicative and non-limiting purposes with reference to the attached drawings, wherein.

DESCRIPTION OF A PREFERRED EMBODIMENT

Referring to the attached drawings, 100 generally indicates an apparatus for connecting at least one electronic device, in the example device 30, to a telecommunication network 50 comprising a fixed telecommunication network 40 and a mobile telecommunication network 41.

The apparatus 100 allows the electronic device 30 to exchange information with other devices by connecting to the telecommunication network 50.

In the scope of the present invention, the information exchangeable between the electronic device 30 and the telecommunication network 50 comprise data, for example data packet, voice and voice over internet protocol (VoIP). Hereinafter, such information shall generally be referred to as "data/voice".

The apparatus 100 comprises connecting means 20 for connecting the electronic device 30. In such manner it is possible to connect a computer, a mobile terminal, a palmtop, a TV apparatus or any other electronic device capable of exchanging information containing data/voice with the telecommunication network 50. Said telecommunication network supports a plurality of services.

An ATA interface is included in the preferred embodiment of the apparatus to act as an interface which allows the user of the apparatus to use analogue phones (POTS—Plain Old Telephone Service, POS—Point of Sale, FAX and DECT cordless phones) on the IP network. This ATA interface provides conversions between analogical signals and SIP and 'vice versa'.

In order to allow exchange of data/voice with the fixed telecommunication network 40, the apparatus 100 comprises a first interface 21.

Such first interface allows the user to use the electronic device 30 for connection to the fixed network 40 and, through the latter for example to the internet connection, establishing a connection of the xDSL type. In this case, the first interface 21 is able to establish an xDSL connection with the fixed telecommunication network 40. Alternatively, the first interface 21 may allow a data/voice connection through other protocols or signal systems.

The apparatus 100 further comprises a second interface 22 and a connection manager 60 able to establish a communication of the connecting means 20 with the first interface 21, or with the second interface 22, or both with the first interface 21 for one or more services and the second interface 22 for other services.

Figure 2:
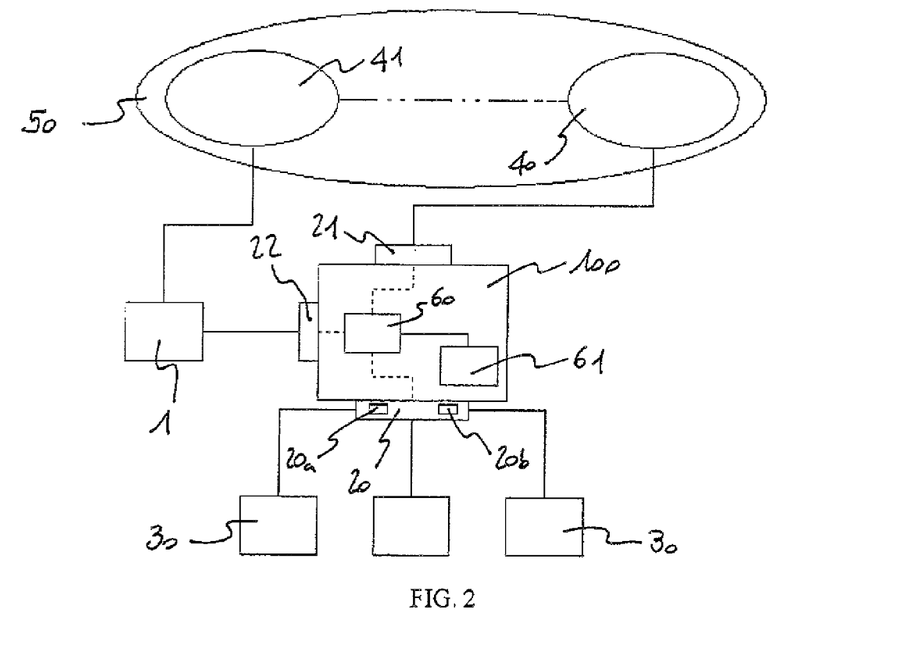
FIG. 2 shows an overall view of a first embodiment of the apparatus for connecting an electronic device to a communication network according to the present invention.

Referring to FIG. 2, the second interface 22 is able to exchange data/voice with the mobile telecommunication network 41. Depending on the type of electronic device of the user, the apparatus 100 is capable of exchanging data, for example in packets, or data of the voice type or voice of the VoIP (Voice over Internet Protocol) type.

The connection manager 60 is in signal communication with control means 61.

Such control means 61 generate a control signal to control the operation of the connection manager 60, so as to allow exchange of data/voice information between the electronic device 30 connected to the connecting means 20 and the fixed telecommunication network 40 or the mobile telecommunication network 41 or both the fixed telecommunication network 30 and the mobile telecommunication network 41.

Due to the presence of the connection manager 60 controllable by the control means 61, a constant exchange of data/voice between the electronic device 30 and the telecommunication network 50 is possible, in that a connection with the fixed telecommunication network 40 and/or mobile telecommunication network 41 is always guaranteed.

Therefore, the apparatus 100 guarantees that the connection to the telecommunication network 50 is always active regardless of the operation status of the fixed telecommunication network 40, thus avoiding loss of information and hence allow the user to continue exchanging data/voice when using the electronic device 30.

Additionally, by using the apparatus 100 of the present invention it is possible to exchange data/voice with the aim of allowing the fixed or mobile telecommunication network provider to activate, in the device 30, targeted services such as for example special telephone services for the user.

In one embodiment, the connecting means 20 comprise at least one between a data communication interface 20*a* and a voice communication interface 20*b* for connecting the apparatus 100 to at least one electronic device 30 able to exchange data/voice.

The connecting means 20 can comprise communication interfaces with or without wires, for example USB or RS232 connection ports, or Wi-Fi interfaces for connecting the apparatus 100 to one or more electronic devices 30 provided with Wi-Fi transceiver means. For example, a DECT phone can be used as a wireless alternative to twisted pair POTS telephone connections. Faxes can also be connected to the router; and even though fax service is a data connection as such, it could be confused with the data connection like web browsing, WI-fi, etc.: this fax data exchange is completely different.

During the connection of a user device 30 to the telecommunication network 50, for example internet, should the connection or the data/voice flow exchanged between the apparatus 100 and the fixed network 40 no longer be available, like in case of malfunctions or failure of the network itself, the control means 61, upon the verification of the operation status of the first interface 21, generate the control signal and send it to the connection manager 61 which perform the switching from the first interface 21 to the second interface 22 for every service, or only some services are switched from the first interface 21 to the second interface 22.

Following the switching of the connection of the connecting means 20 from the first interface 21 to the second interface 22, the apparatus 100 is connected to the mobile network 41. In this manner, the electronic device 30 remains constantly connected to the telecommunication network 50.

In order to establish a connection with the mobile telecommunication network 41, the apparatus 100 of the invention further comprises a first device 1 connected to the second interface 22. The first device 1 may be a mobile connection module, for example of the 2G or 3G type. For example, the device 1 may be a UMTS or HSPDA module capable of establishing a connection with a mobile network in UMTS or HSDPA mode.

Device 1 can also be a device supporting other technologies, such as LTE, WiMAX and potentially a non-cellular mobile telecommunication implementation.

The control means 61 are able to verify the presence of data/voice flow between the connecting means and the first interface 21 and the presence of data/voice flow between the connecting means 20 and the second interface 22. For such purpose, the control means can be connected to the first and the second interfaces 21 and 22. The control signal is thus generated as a function of the verification performed by the control means 61.

According to one embodiment, the control means 61 include detection means for detecting status of a first connection established between the first interface 21 and the fixed telecommunication network 41. In this case, the control signal is generated as a function of the operating status of said first connection established with the fixed network 40 (for example, an xDSL line) as detected by the detection means.

In order to detect failure of said first connection, the operation status of at least one of the different OSI reference model layers of said first connection is checked.

Figure 4:
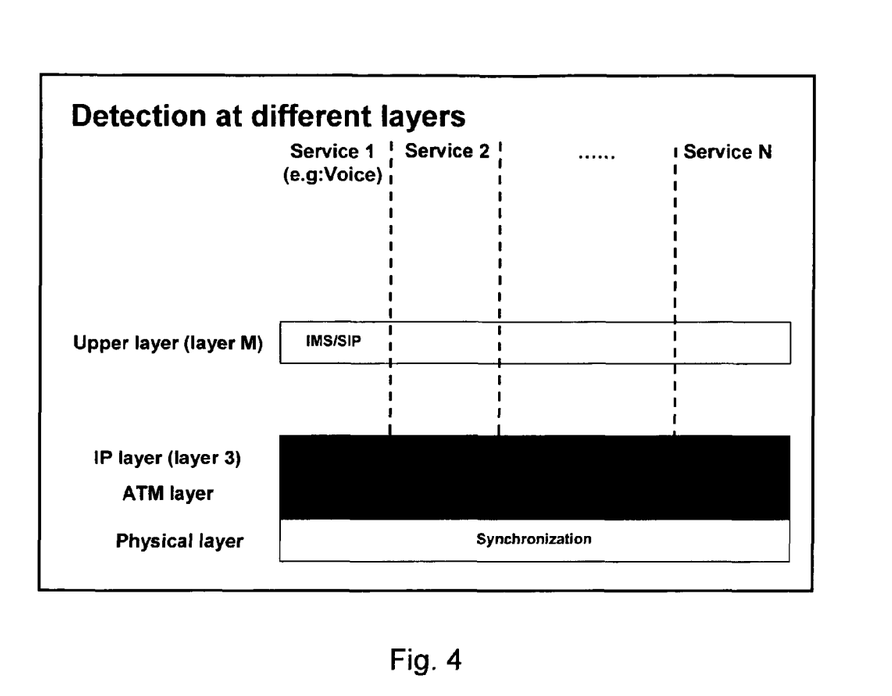
FIG. 4 shows detection of DSL link failure detection at different layers.

FIG. 4 shows the different layers of the protocol stack used in the xDSL line, for any of the N services offered, such as Voice (POTS & ISDN), Faxes, VAP, IPTV, etc.

Each of these services is transported over a different protocol stack. The way to detect a failure is different for each service, depending on the protocol or configuration used for transporting that service traffic.

Once it is detected lack of connectivity for a specific service in one of these layers detects: SIP (Session Initiation Protocol)/IMS(IP Multimedia Subsystem), DHCP (Dynamic Host Configuration Protocol), PPPoE (Point-to-point Protocol over Ethernet), DNS (Domain Name System), etc., the control means generate a 'DSL partial link failure' control signal which actuates over the communication manager, deriving the service traffic affected by the detected failure to the mobile telecommunication network 41 via the first device 1 connected to the second interface 22. The rest of the service traffic not affected by the failure is served by the fixed telecommunication network 40 via the first interface 21.

If a link failure is detected at physical layer due to the lack of synchronization, this implies a general failure on the DSL line, and a complete DSL link failure is declared. Thus, the control means generate a control signal which actuates over the communication manager, deriving all data/voice exchange over the mobile telecommunication network 41 via the first device 1 connected to the second interface 22.

It is also possible that it is previously determined that in case of a complete DSL link failure not to change all services to the second interface (so as not to overload the mobile telecommunication network), but to protect some services (for example, voice) and deviate them to the mobile telecommunication network by means of the first device, but not deviate some other services (for example, IPTV), which will not be served at all.

In a preferred embodiment, the control means detect DSL link unavailability for two different purposes:

Zero activation (before the delivery of the line)

Back-up (over the lifecycle of the connection)

In the 'zero activation' case, once the apparatus 100 is connected to a wall socket in the house of a user, the apparatus tries to get connectivity to the DSL line through the connection established between the connection means 20 and the first interface 21. These attempts are performed by the apparatus according to a first periodicity. Such first periodicity is configurable. The 'timer activation' indicates how often the apparatus (its control means) will test the status of the connection established between the connection means 20 and the first interface 21 before its first connection to the DSL link.

In the 'back-up' case, once the DSL line is activated, said DSL line status is periodically checked according to a second periodicity. Said second periodicity is configurable. The 'timer backup' indicates how often the apparatus (its control means) tests the status of the connection established between the connection means 20 and the first interface 21 after its first connection to the DSL link.

The DSL line failure can be detected according to the steps described below, where:

Upper connectivity failure (UCF): check of the connectivity for certain types of traffic (IMS signalling, H323, . . . ).

IP connectivity failure (ICF): check of IP connectivity (by means of PPPoE or DNS presence or DHCP . . . ).

ATM connectivity failure (ACF): check of ATM connectivity (availability per PVC).

DSL Synchronization failure (SCF): check of the status of synchronization at physical level.

For a first service type 'Service_1', which in this case corresponds to voice:

```
Repeat every (Timer_Backup or Timer_Activation)
If (UCF=true) then
    If (ICF=true) then
        If (ACF=true) then
            If (SCF=true) then
                        Complete DSL link failure= true
                        Switch to a secondary path (complete
                            change)
            Else
                        Partial DSL link failure=true
                        Seek a secondary path (partial change)
        Else
                Partial DSL link failure= true
                Switch to a secondary path (partial change)
    Else
        Partial DSL link failure=true
        Seek a secondary path (partial change)
    Else back to the beginning (after expiration of timer_backup or
timer_activation)
```

In the case of VoIP (Voice over IP) service, failure should be detected at the Upper layer (Layer M) (IMS unregistration), or at the physical layer.

For a second service type 'Service_2', which in this case corresponds to data:

```
Repeat every (Timer_Backup or Timer_Activation)
If (UCF=true) then
    If (ICF=true) then
        If (ACF=true) then
            If (SCF=true) then
                        Complete DSL link failure= true
                        Switch to a secondary path (complete
                            change)
            Else
                        Partial DSL link failure=true
                        Seek a secondary path (partial change)
        Else
                Partial DSL link failure= true
                Switch to a secondary path (partial change)
    Else
        Partial DSL link failure=true
        Seek a secondary path (partial change)
    Else back to the beginning (after expiration of timer_backup or
timer_activation)
```

For data, failure is detected at IP level (following protocol PPPoE), at ATM level or at the physical layer.

For a third service type, for example, VAP (Vodafone Access Point) detection is carried out at IP, ATM or physical layer.

For a fourth service type, for example, IPTV detection is carried out at DHCP, ATM or physical level.

It is possible to set different timers of periodicity for each service type, in order to define how often the link monitoring is performed.

Figure 5:
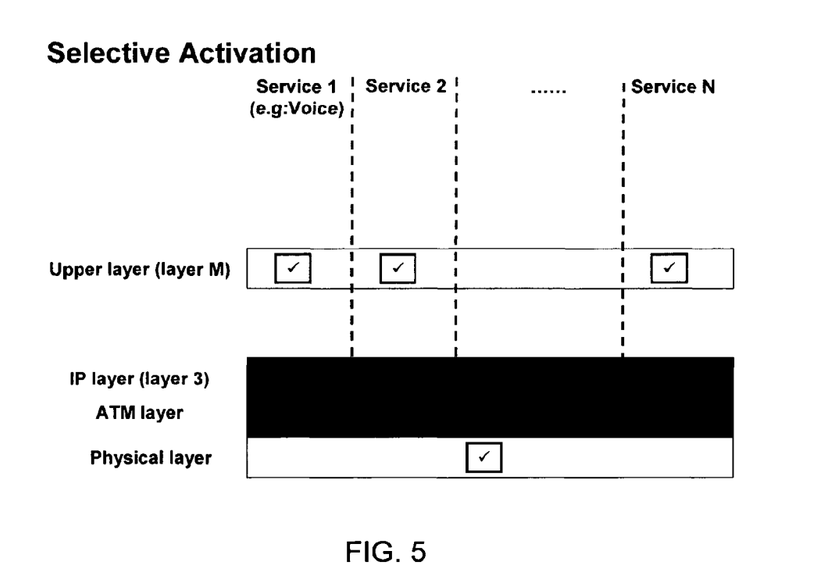
FIG. 5 schematically shows an example to selectively activate detection of a service in each layer.

It is possible to selectively activate detection of a service in each layer. Indeed, it is possible to disable the verification of one or more layers for a specific type of service, such that the control means do not check that "disabled" layer during the monitoring of the link.

In the case shown in FIG. 5, the ATM layer has been disabled for type of service 'Service_2'. So such ATM layer is not monitored by the control means for that specific service.

Once the control means have detected some type of failure and connection of the electronic device(s) 30 has been deviated, for all or some type of service, from the first interface to the second interface, the situation is reversible; and so, said one or more services that have been changed can be changed back to their initial connection (to the default configuration).

Figure 6:
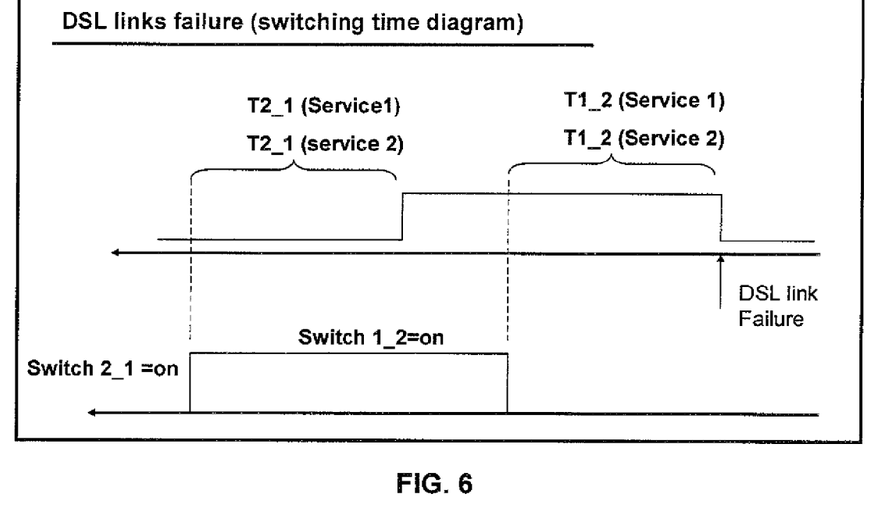
FIG. 6 shows a switching time diagram upon detection of a DSL link failure.

For such purpose, as shown in FIG. 6, a timer is defined which allows to determine on when the inactivity period of the DSL line expires in order to avoid undesirable hysteresis effects on the line.

In some scenarios, it is possible to determine that a specific service which has been protected and deviated to the mobile telecommunication network 41 via the first device 1 connected to the second interface 22, is not reversible. Such a case can be configured by setting the corresponding timer for that specific service to 0.

Each timer is configurable for each type of service: voice (POTS&ISDN), IPTV, data, . . . .

Timer1_2$_{i=1 \ldots N}$: timer for changing from connection with the first interface 21 to connection with the second interface 22 (measured in ms; i being the type of service)

As indicated before, if the timer Timer1_2 is set to 0, it means that switching is disabled for the service i.

Timer2_1$_{i=1 \ldots N}$: timer for changing from connection with the second interface 22 to connection with the first interface 22 (measured in ms; i being the type of service)

Also, if the timer Timer2_1 is set to 0 it means that switching is disabled for the service i.

In case of complete link failure (at physical layer) all timers related to the services whose traffic has been changed are initiated simultaneously.

Figure 3:
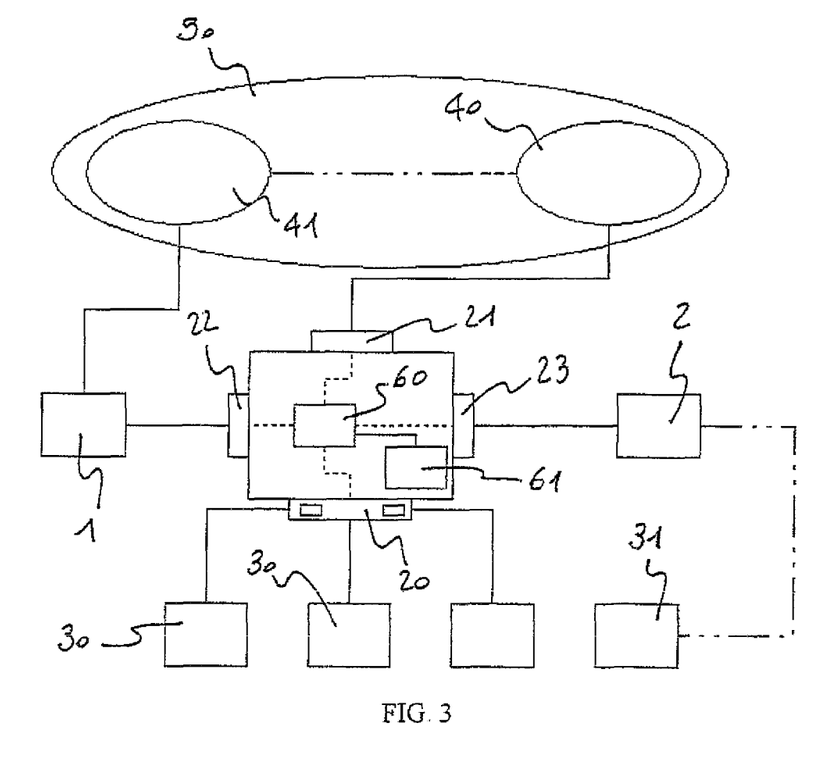
FIG. 3 shows an overall view of a second embodiment of the apparatus for connecting an electronic device to a telecommunication network according to the present invention.

Shown in FIG. 3 is the apparatus 100 according to a second embodiment of the present invention. According to such embodiment, the fixed telecommunication network 40 is in communication with the mobile telecommunication network 41.

Advantageously, the apparatus 100 is provided with a third interface 23 for the connection to a second device 2 able to generate a mobile cell for exchanging data/voice with a mobile device 31.

The mobile device 31 may for example comprise a mobile phone, a palmtop or any other mobile electronic device able to exchange data/voice.

According to such embodiment, the connection manager 60 is able to establish a communication of the third interface 23 with the first interface 21 in such a manner to establish a communication of the second device 2 with the mobile network 41, through communication with the fixed network 40.

In particular, the second device 2 comprises a base access station able to receive or transmit data/voice with the mobile electronic device 31.

According to the points outlined above, the apparatus 100 of the present invention can allow the mobile electronic device 31 to remain connected to the mobile telecommunication network 41 through the connection of the third interface 23 with the first interface 21, connected to the fixed network 40, in such a manner to allow the exchange of data/voice between the mobile device 31 and the mobile telecommunication network 41.

In this manner, it is possible for example to improve the mobile coverage in a determined and restricted area guaranteeing the user a constant connection with the mobile network 41.

In an embodiment, when the apparatus 100 connects the mobile electronic device 31 to the mobile telecommunication network 41 the first device 1 connected to the second interface 22 is OFF. In such manner, it is possible to avoid any transmission interferences between the first device 1 and the second device 2. Similarly, in this particular embodiment, when the first device 1 connected to the second interface 22 is ON, the mobile electronic device 31 connected to the third interface is OFF.

Thus, the apparatus 100 allows a connection and hence a constant data/voice exchange between the mobile electronic device 31 and the mobile telecommunication network 41 through connection to the first interface 21 connected to the fixed network 40.

According to a preferred embodiment of the invention, the connection manager works as a switch.

According to a preferred embodiment, the apparatus 100 is configured to work as follows:

The apparatus has one dedicated USB Master 2.0 port to connect the first device, which is an HSPA Module.

The control means of the apparatus is able to command Mobile Network attachment/detachment of the HSPA Module based on the real need to forward voice or data traffic via HSPA.

For Voice Traffic

The factory default configuration of the apparatus forwards (without any manual operation) Voice traffic towards the HSPA module using the 3G/2G available mobile network.

The apparatus is able to automatically switch from HSPA to DSL (ATA VoIP) line as soon as the ATA module registers to SBC (Session Border Control), to the IMS network. In case there is a GSM active call and the Voice PVC (Permanent Virtual Channel) starts up, the apparatus waits until the call is finished before switching (automatically) to DSL line.

In case the ATA module loses its connection/registration to the IMS network, the apparatus is able to automatically switch voice calls to HSPA module that use 3G/2G mobile network, depending on the better radio coverage.

The HSPA module back-ups both the FXS (Foreign eXchange Subscriber). In particular, if there are two POTS (POTSa e POTSb) connected to both FXS, the user can answer to incoming call using independently POTSa or POTSb. If the user answers with POTSa, a "FAST BUSY TONE" is heard on POTSb (and viceversa).

Also, if there are two POTS (POTSa e POTSb) connected to both FXS, the user can make a call using independently POTSa or POTSb. If the user makes a call with POTSa, a "FAST BUSY TONE" is heard on POTSb (and viceversa).

For Data Traffic

At the first boot (Zero Activation) the apparatus default configuration does not connect automatically to the HSPA network (PdP context) for Data traffic.

The apparatus is able to automatically switch from HSPA to DSL line as soon as the Data PVC properly starts up and gets an IP address from an DHCP server.

After each reboot, the apparatus is able to recognize where to forward voice traffic (to HSPA or DSL line). If the DSL line is active, data goes through the WAN interface as well as voice traffic. If the apparatus is rebooted but DSL is inactive, the HSPA module shall be used for both data (manually) and voice (automatically) traffic.

It now follows a description of a method for connecting the electronic device 30 to the telecommunication network according to the present invention.

Such method comprises the steps of:

a) connecting the electronic device 30 to the apparatus 100 through connecting means 20, b) connecting the apparatus 100 to the fixed telecommunication network 40 and/or to the mobile telecommunication network 41 through the communication manager 60, c) generating a control signal to control the connection manager 60 in such a manner to allow the data/voice exchange between the electronic device 30 connected to the connection means 20 and the fixed telecommunication network 40 and/or the mobile telecommunication network 41.

Advantageously, the abovementioned method further provides for connecting the first device 1, able to establish a connection with the mobile telecommunication network 41, to the apparatus 100.

In order to guarantee constant connection to the telecommunication network, further provided for is the control of the presence of data/voice flow between the connection means 20 and the fixed telecommunication network 40 and between the connection means 20 and the mobile telecommunication network 41.

It is clear that, through the abovementioned method, it is thus possible to guarantee, to one or more user electronic devices 30, a constant connection to the telecommunication network, for example the internet network, even in case or malfunctions or failures of the fixed telecommunication network 40.

Advantageously, the method for connecting the electronic device 30 to the telecommunication network, comprises the steps of:

connecting the second device 2 to the apparatus 100 for connecting to the mobile telecommunication network 41, generating a mobile cell for exchanging data/voice with the mobile electronic device 31, actuate over the connection manager 60 in order to establish a connection between the second device 2 and the mobile telecommunication network 41.

Furthermore, even more advantageously, in case of lack of mobile coverage, for example in the user's house, the method for connecting enables one or more mobile electronic devices to connect to the mobile telecommunication network.

As observable from the description above, the apparatus according to the present invention allows meeting the requirements and overcoming the drawbacks herein referred to in the introductory part of the present description with reference to the prior art.

Obviously, the afore-described invention may be subjected to numerous modifications and variants—by a man skilled in the art with the aim of meeting the possible and specific requirements—all falling within the scope of protection of the invention as defined by the following claims.

The invention claimed is:

1. An apparatus for connecting at least one electronic device to a telecommunication network comprising a fixed telecommunication network and a mobile telecommunication network, said telecommunication network supporting a plurality of services, the apparatus comprising:

connecting means for connecting said at least one electronic device;

a first interface able to exchange data/voice with said fixed telecommunication network according to one or more of said plurality of services;

a second interface able to exchange data/voice with said mobile telecommunication network according to one or more of said plurality of services;

a connection manager for establishing a communication:

between said connecting means and said first interface, or between said connecting means and said second interface, or between said connecting means and both said first interface and said second interface; and, control means in signal communication with said connection manager and able to generate a control signal to control said connection manager, so as to determine an exchange of data/voice between the electronic device connected to said connecting means and:
the fixed telecommunication network, or
the mobile telecommunication network, or
the fixed telecommunication network for a first subset of said plurality of services and the mobile telecommunication network for a second subset of said plurality of services,
wherein upon detection of failure of a communication established between the first interface and the fixed telecommunication network, said connection manager is configured to perform at least one of the following:
establish a communication between said connecting means and the second interface such that any data/voice service of the plurality of services that was being provided by the fixed telecommunication network is now provided by the mobile telecommunications network; or
for a first service of the plurality of services, establish a communication between said connecting means and the second interface such that any data/voice of the first service of the plurality of services that was being provided by the fixed telecommunication network is now provided by the mobile telecommunications network; and
maintain the communication between said connecting means and the first interface for every other service of the plurality of services except the first service, and said every other service of the plurality of services is served by the fixed telecommunication network.

2. The apparatus according to claim 1, wherein said control means are configured to verify voice/data flow between said connecting means and said first interface, said control signal being generated as a function of said verification performed by said control means.

3. The apparatus according to claim 2, wherein said control means are configured to carry out said verification or said detection means are configured to carry out said detection in a periodic way, with a configurable periodicity.

4. The apparatus according to claim 3, wherein said periodicity is a different periodicity for each one or more of said plurality of services.

5. The apparatus according to claim 3, wherein said periodicity is a first predefined periodicity configured to run upon powering up the apparatus and the detection means detecting no first connection between the first interface and the fixed telecommunication network.

6. The apparatus according to claim 2, wherein upon verification of no voice/data flow between the connection means and said first interface, said connection manager is configured to establish a communication between said connection means and the second interface, and said one or more plurality of services are served by the mobile telecommunication network via a first device connected to said second interface and able to establish a connection with said mobile telecommunication network.

7. The apparatus according to claim 1, wherein said control means include detection means for detecting status of a first connection established between the first interface and the fixed telecommunication network, said control signal being generated as a function of said detection performed by said detection means.

8. The apparatus according to claim 7, wherein said detection means are configured to detect failure of said first connection upon checking the operation status of at least one of the different OSI reference model layers of said first connection.

9. The apparatus according to claim 8, wherein checking the operation status of at least one of said layers of said first connection is carried out in an independent way for each one or more of said plurality of services.

10. The apparatus according to claim 7, wherein upon detection of failure of said first connection established between the first interface and the fixed telecommunication network, said connection manager is configured to establish a communication between said connection means and the second interface, and said one or more plurality of services are served by the mobile telecommunication network via a first device connected to said second interface and able to establish a connection with said mobile telecommunication network.

11. The apparatus according to claim 1, further comprising a first device connected to said second interface and able to establish a connection with said mobile telecommunication network.

12. The apparatus according to claim 11, wherein said first device is a mobile connection module.

13. The apparatus according to claim 1, wherein the connection manager is configured to work as a switch, and is configured to either establish a communication between said connecting means and said first interface, or either between said connecting means and said second interface.

14. The apparatus according to claim 1, wherein upon generation of a control signal, the connection manager is further configured to let a pre-established period of time lapse prior to changing the exchange of data/voice between the electronic device and the fixed telecommunication network, or the mobile telecommunication network, or both.

15. The apparatus according to claim 14, wherein said pre-established period of time is different for each one or more of said plurality of services.

16. The apparatus according to claim 1, which further comprises:
a third interface able to exchange data/voice according to one or more of said plurality of services;
a second device connected to said third interface and able to generate a mobile cell for exchanging data/voice with a mobile terminal,
wherein said connection manager is able to further establish a communication between said first interface and said third interface so as to establish a communication between said second device and said mobile network by communication with said fixed network,
and wherein said connection manager is further configured to disable the communication between said connection means and said second interface.

17. The apparatus according to claim 16, wherein said second device comprises an access base station able to receive and transmit data/voice with said mobile terminal.

18. A method for connecting at least one electronic device to a telecommunication network comprising a fixed telecommunication network and a mobile telecommunication network, said telecommunication network supporting a plurality of services, the method comprising the steps of:
a) connecting, through connecting means, said at least one electronic device to an apparatus, the apparatus comprising:
connecting means for connecting said at least one electronic device;
a first interface able to exchange data/voice with said fixed telecommunication network according to one or more of said plurality of services;

a second interface able to exchange data/voice with said mobile telecommunication network according to one or more of said plurality of services;
a connection manager for establishing a communication:
between said connecting means and said first interface, or
between said connecting means and said second interface, or
between said connecting means and both said first interface and said second interface; and,
control means in signal communication with said connection manager and able to generate a control signal to control said connection manager, so as to determine an exchange of data/voice between the electronic device connected to said connecting means and:
the fixed telecommunication network, or
the mobile telecommunication network, or
the fixed telecommunication network for a first subset of said plurality of services and the mobile telecommunication network for a second subset of said plurality of services,
b) connecting, through the connection manager, said apparatus to the fixed telecommunication network, or to the mobile telecommunication network, or both to the fixed telecommunication network for a first subset of said plurality of services and to the mobile telecommunication network for a second subset of said plurality of services, and
c) generating a control signal for controlling said communication manager to determine an exchange of data/voice between said the electronic device connected to said connecting means and said fixed telecommunication network, or said mobile telecommunication network, or both the fixed telecommunication network and the mobile telecommunication network.

19. The method according to claim 18, which further comprises verifying voice/data flow between said connecting means and said first interface, said control signal being generated as a function of said verification.

20. The method according to claim 18, which further comprises detecting status of a first communication established between said first interface and the fixed communication network, said control signal being generated as a function of said detection.

21. The method according to claim 18, further comprising the step of:
connecting to said apparatus a first device able to establish a communication with said mobile telecommunication network.

22. The method according to claim 18, further comprising the step of:
connecting to said apparatus a second device for the connection to said mobile telecommunication network,
said second device generating a mobile cell for exchanging data/voice with a mobile terminal, and wherein
the control signal is generated to actuate over the connection manager for connecting said first interface to said third interface so as to establish a connection between said second device and said mobile telecommunication network.

23. An apparatus for connecting at least one electronic device to a telecommunication network comprising a fixed telecommunication network and a mobile telecommunication network, said telecommunication network supporting a plurality of services, the apparatus comprising:
connecting means for connecting said at least one electronic device;
a first interface able to exchange data/voice with said fixed telecommunication network according to one or more of said plurality of services;
a second interface able to exchange data/voice with said mobile telecommunication network according to one or more of said plurality of services;
a connection manager for establishing a communication:
between said connecting means and said first interface, or
between said connecting means and said second interface, or
between said connecting means and both said first interface and said second interface; and
control means in signal communication with said connection manager and able to generate a control signal to control said connection manager, so as to determine an exchange of data/voice between the electronic device connected to said connecting means and:
the fixed telecommunication network, or
the mobile telecommunication network, or
the fixed telecommunication network for a first subset of said plurality of services and the mobile telecommunication network for a second subset of said plurality of services;
wherein said control means include detection means for detecting status of a first connection established between the first interface and the fixed telecommunication network, said control signal being generated as a function of said detection performed by said detection means, and
wherein said detection means are configured to detect failure of said first connection upon checking the operation status of at least one of the different OSI reference model layers of said first connection.

* * * * *